United States Patent
Nagata

(10) Patent No.: US 7,750,795 B2
(45) Date of Patent: Jul. 6, 2010

(54) IN-VEHICLE SYSTEM, DETAILED WARNING LAMP INFORMATION NOTIFICATION SYSTEM, AND SERVER SYSTEM

(75) Inventor: Asako Nagata, Chita (JP)

(73) Assignee: Denso Corporation, Kariya (JP)

( * ) Notice: Subject to any disclaimer, the term of this patent is extended or adjusted under 35 U.S.C. 154(b) by 607 days.

(21) Appl. No.: 11/662,039

(22) PCT Filed: Dec. 13, 2005

(86) PCT No.: PCT/JP2005/022838

§ 371 (c)(1),
(2), (4) Date: Mar. 6, 2007

(87) PCT Pub. No.: WO2006/064787

PCT Pub. Date: Jun. 22, 2006

(65) Prior Publication Data

US 2008/0316009 A1    Dec. 25, 2008

(30) Foreign Application Priority Data

Dec. 14, 2004  (JP) .............................. 2004-361458
Sep. 30, 2005  (JP) .............................. 2005-287226

(51) Int. Cl.
B60Q 1/00   (2006.01)
B60Q 11/00  (2006.01)
B60Q 1/26   (2006.01)
B60R 25/10  (2006.01)

(52) U.S. Cl. ...................... 340/438; 340/439; 340/440; 340/426.22; 340/426.24; 340/458; 116/54

(58) Field of Classification Search .................. 340/438
See application file for complete search history.

(56) References Cited

U.S. PATENT DOCUMENTS

| | | | | |
|---|---|---|---|---|
| 4,092,642 | A | * | 5/1978 | Green et al. ................. 340/527 |
| 5,764,139 | A | * | 6/1998 | Nojima et al. ............... 340/461 |
| 5,917,408 | A | * | 6/1999 | Cardillo et al. ............. 340/439 |
| 6,009,355 | A | | 12/1999 | Obradovich et al. |
| 6,131,060 | A | | 10/2000 | Obradovich et al. |
| 6,175,782 | B1 | | 1/2001 | Obradovich et al. |
| 6,233,506 | B1 | | 5/2001 | Obradovich et al. |
| 6,282,464 | B1 | | 8/2001 | Obradovich |
| 6,330,497 | B1 | | 12/2001 | Obradovich et al. |
| 6,438,465 | B2 | | 8/2002 | Obradovich et al. |

(Continued)

FOREIGN PATENT DOCUMENTS

CN    2247806    2/1997

(Continued)

OTHER PUBLICATIONS

Official action dated Nov. 26, 2008 in Korean Application No. 10 2007-7008082 with English translation thereof.

(Continued)

*Primary Examiner*—Daniel Wu
*Assistant Examiner*—Pameshanand Mahase
(74) *Attorney, Agent, or Firm*—Harness, Dickey & Pierce, PLC

(57) ABSTRACT

When a warning lamp 20a on the meter panel lights up in an in-vehicle system 1, the description of the content of warning and coping strategies about the lighted warning lamp are displayed on a display device 13. Thus, a user can be swiftly informed of the description of the content of warning and coping strategies. This can make it unnecessary for the user to spend time and effort looking for a service manual and opening the service manual and searching for appropriate pages, and can enhance user-friendliness.

9 Claims, 14 Drawing Sheets

U.S. PATENT DOCUMENTS

| | | |
|---|---|---|
| 6,449,535 B1 | 9/2002 | Obradovich et al. |
| 6,459,961 B1 | 10/2002 | Obradovich et al. |
| 6,542,794 B2 | 4/2003 | Obradovich |
| 6,542,795 B2 | 4/2003 | Obradovich et al. |
| 6,577,928 B2 | 6/2003 | Obradovich |
| 6,587,758 B2 | 7/2003 | Obradovich et al. |
| 6,587,759 B2 | 7/2003 | Obradovich et al. |
| 6,698,461 B1 * | 3/2004 | Bryan et al. .................... 141/1 |
| 6,700,504 B1 * | 3/2004 | Aslandogan et al. ........ 340/901 |
| 6,857,010 B1 | 2/2005 | Cuijpers et al. |
| 6,859,687 B2 | 2/2005 | Obradovich et al. |
| 6,922,616 B2 | 7/2005 | Obradovich et al. |
| 6,956,470 B1 | 10/2005 | Heise et al. |
| 2001/0038414 A1 | 11/2001 | Hofer et al. |
| 2002/0065585 A1 | 5/2002 | Obradovich |
| 2004/0036588 A1 * | 2/2004 | Will ........................... 340/438 |
| 2004/0162645 A1 * | 8/2004 | Obradovich et al. ........... 701/1 |
| 2005/0165513 A1 | 7/2005 | Obradovich |
| 2005/0203674 A1 | 9/2005 | Obradovich et al. |
| 2006/0247832 A1 * | 11/2006 | Taki ........................... 701/33 |

FOREIGN PATENT DOCUMENTS

| | | |
|---|---|---|
| CN | 1518709 | 8/2004 |
| JP | 62-094443 | 4/1987 |
| JP | 11-78611 A | 3/1999 |
| JP | 11-200939 A | 7/1999 |
| JP | 2000-20900 A | 1/2000 |
| JP | 2002-2418 A | 1/2002 |
| JP | 2002-29364 A | 1/2002 |
| JP | 2002-46503 A | 2/2002 |
| JP | 2002-505631 A | 2/2002 |
| JP | 2002-140797 A | 5/2002 |
| JP | 2002-228554 A | 8/2002 |
| JP | 2002-331884 A | 11/2002 |
| JP | 2003-22330 A | 1/2003 |
| JP | 2003-508769 A | 3/2003 |
| JP | 2003-196800 A | 7/2003 |
| KR | 10 2003-0001665 | 1/2003 |

OTHER PUBLICATIONS

Office Action dated Nov. 21, 2008 issued in the corresponding CN Application No. 200580037329.4 with English translation.

Official action dated Dec. 10, 2008 in Japanese Application No. 2005-287226.

Official action dated Jul. 10, 2009 in corresponding Chinese Application No. 2005 80037329.4.

Office Action mailed on Sep. 1, 2009 in the corresponding JP Application No. 2005-287226 with English translation.

* cited by examiner

FIG. 2
(a) MODE IN WHICH OIL PRESSURE WARNING ICON IS DISPLAYED
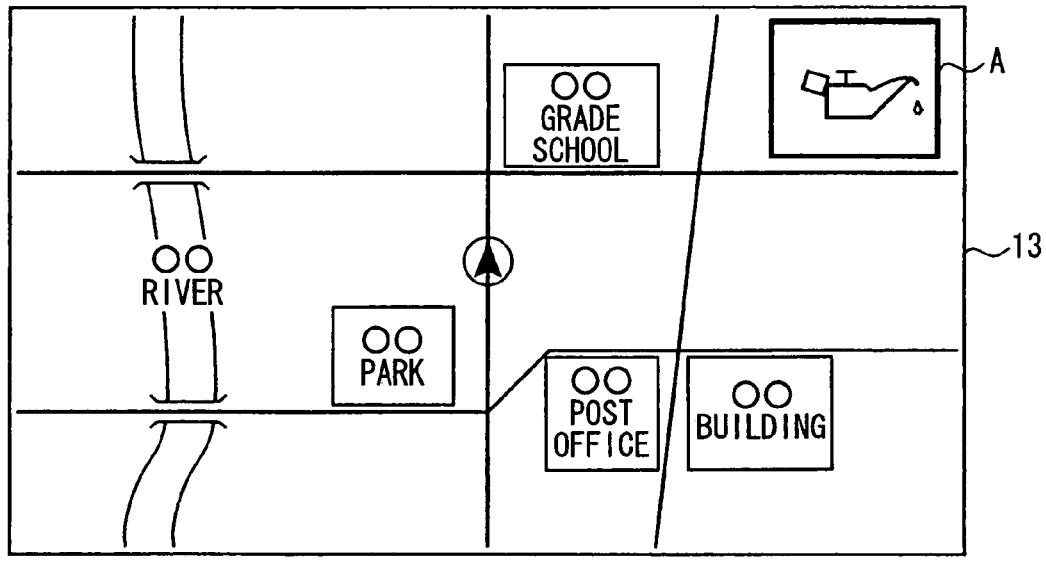
(b) MODE IN WHICH CHARGE WARNING ICON IS DISPLAYED
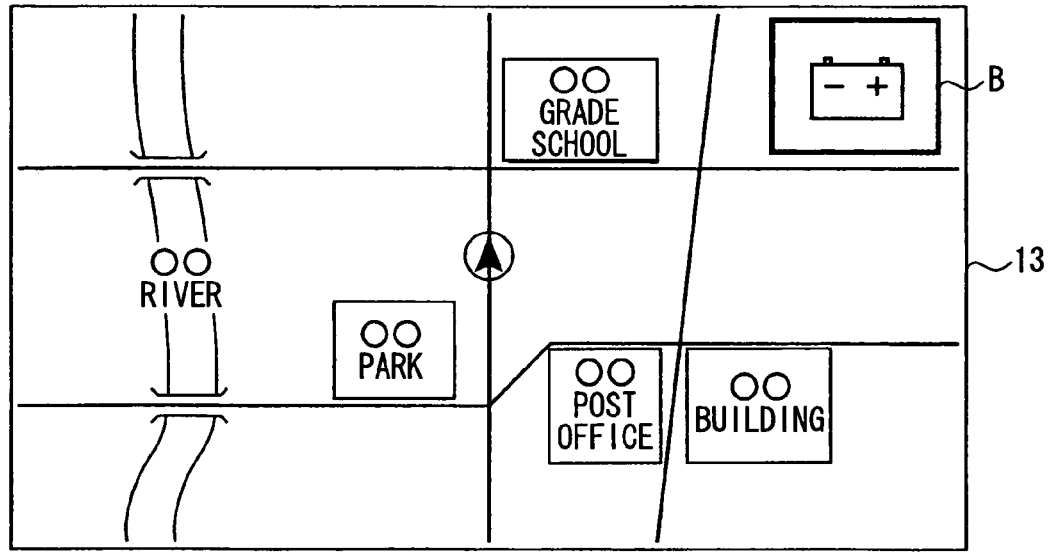
(c) OTHER WARNING ICONS
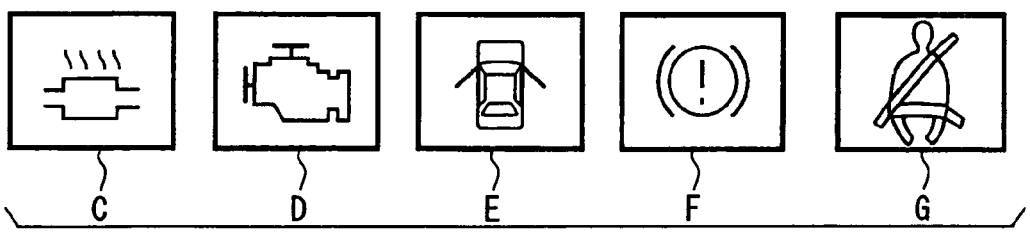

WHEN THE ENGINE IS RUNNING, OIL IS CIRCULATED THROUGH THE VARIOUS PARTS OF THE ENGINE.
WHEN THE PRESSURE FOR CIRCULATING OIL IS ABNORMALLY LOWERED, THIS LAMP LIGHTS UP.
IF YOU LEAVE THE ENGINE RUNNING IN THIS STATE, THE ENGINE WILL BE BURNED OUT.
TO PREVENT THIS, STOP THE ENGINE AND CHECK THE OIL QUANTITY. IF THE QUANTITY IS INSUFFICIENT, THEN REFILL ENGINE OIL.
IF THE OIL QUANTITY IS SUFFICIENT, SOME ENGINE COMPONENT MAY HAVE A FAULT.
HAVE THE ENGINE INSPECTED AND MAINTAINED.
CONTACT YOUR DEALER.

~13

(b)

HOW TO CHECK OIL QUANTITY

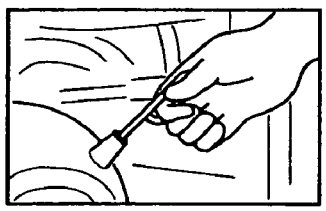
1. PULL OUT OIL LEVEL GAGE.

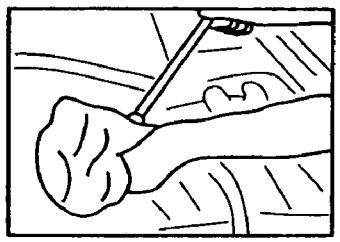
2. WIPE TIP OF GAGE WITH WASTE CLOTH.

~13

(a)

WHEN THE ENGINE IS RUNNING, OIL IS CIRCULATED THROUGH THE VARIOUS PARTS OF THE ENGINE.
WHEN THE PRESSURE FOR CIRCULATING OIL IS ABNORMALLY LOWERED, THIS LAMP LIGHTS UP.

DID YOU STOP THE ENGINE?

[YES]   [NO]

[NEXT]

(b)

DID YOU CHECK THE ENGINE OIL QUANTITY?

[YES]   [NO]

IF YOU DON'T KNOW HOW TO CHECK, PRESS THE BUTTON BELOW.

[LET ME KNOW]   [NEXT]

FIG. 10
(a) MODE IN WHICH OIL PRESSURE WARNING ICON AND HELP ICON ARE DISPLAYED
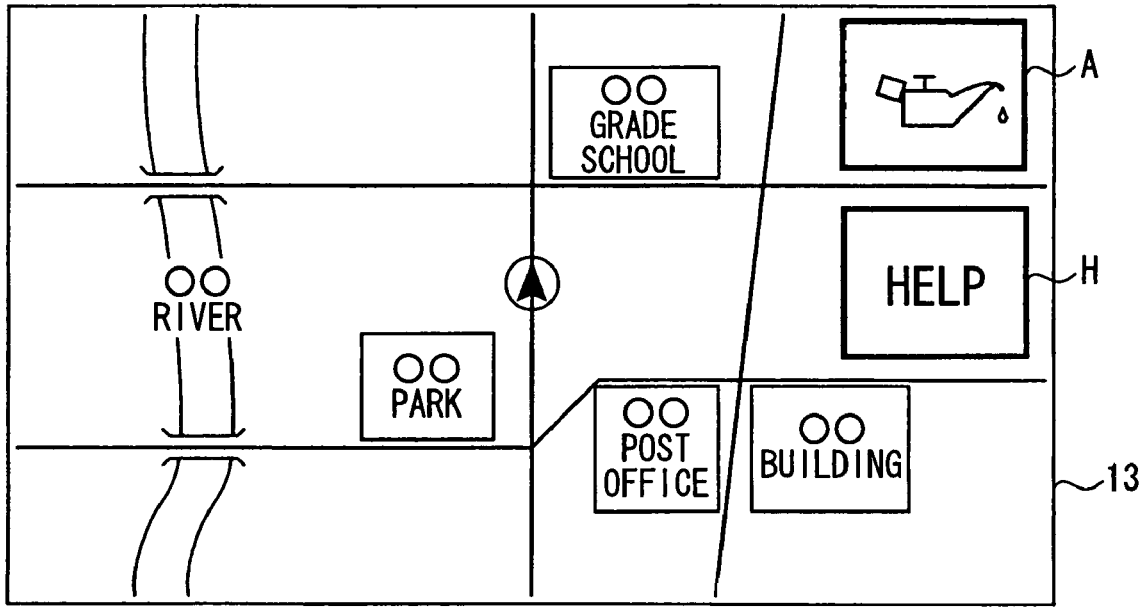
(b) MODE IN WHICH CHARGE WARNING ICON AND HELP ICON ARE DISPLAYED
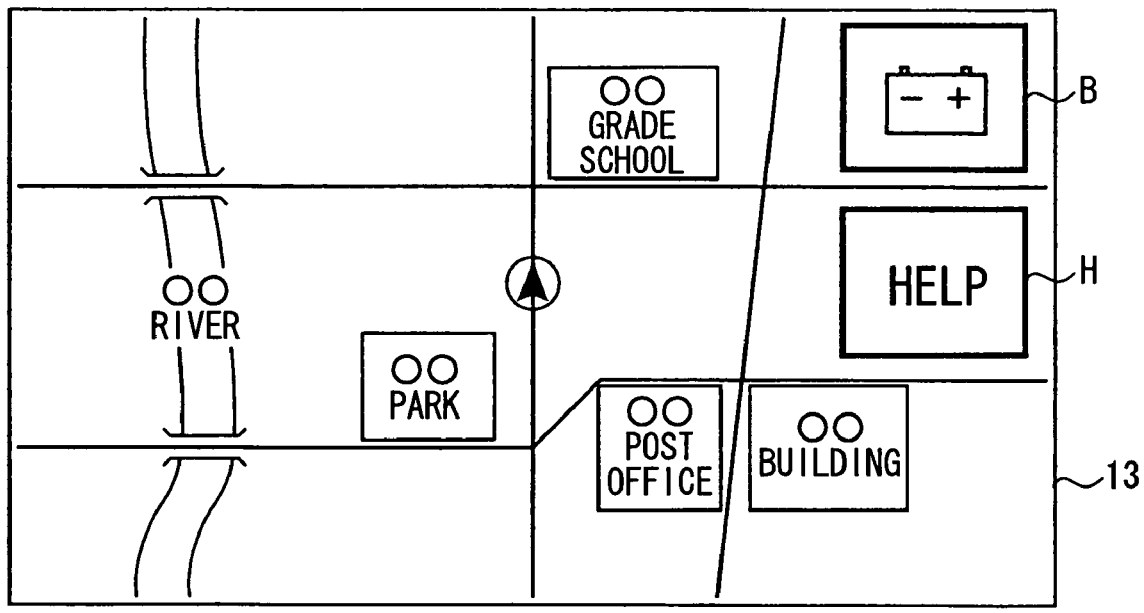

IN-VEHICLE SYSTEM, DETAILED WARNING LAMP INFORMATION NOTIFICATION SYSTEM, AND SERVER SYSTEM

TECHNICAL FIELD

The present invention relates to an in-vehicle system that can be mounted in a vehicle and is so constructed that a warning lamp on a meter panel lights up or flashes in correspondence with the occurrence of an anomaly in a vehicle, a detailed warning lamp information notification system so constructed that it includes the in-vehicle system and a server system, and a server system used in the detailed warning lamp information notification system.

BACKGROUND ART

Vehicles are so constructed that when an anomaly occurs, for example, in the pressure of engine oil, a charging system, or the like, the following takes place: the oil pressure warning lamp, the charge warning lamp, or the like on a meter panel lights up or flashes, and a user is thereby informed of the occurrence of the anomaly in the pressure of engine oil, the charging system, or the like. (Refer to Japanese patent document JP-A-2002-29364, for example.)

A user who is unfamiliar with these warning lamps may be incapable of pinpointing what is faulty or poorly maintained even when the user sees a lighted or flashing warning lamp. In such a case, the user must refer to a service manual to examine the description of the content of the warning or coping strategies. This is inconvenient for users because they take a lot of trouble with looking for a service manual or searching the service manual for appropriate pages.

The invention has been made with the above problem taken into account. An object of the invention is to provide an in-vehicle system, a detailed warning lamp information notification system, and a server system wherein when a warning lamp on a meter panel lights up or flashes, a user can be swiftly informed of the description of the content of the warning, coping strategies, and the like and user-friendliness can be enhanced.

DISCLOSURE OF THE INVENTION

An in-vehicle system according to the present invention is so constructed that the following is implemented: when the warning lamp on a meter panel lights up or flashes, a controlling means causes a notifying means to provide detailed warning lamp information about the lighted or flashing warning lamp. Thus, when the warning lamp on the meter panel lights up or flashes, the user can be swiftly informed of the description of the content of the warning, coping strategies, and the like. This can make it unnecessary for the user to spend time and effort looking for a service manual and opening the service manual and searching for appropriate pages, and can enhance user-friendliness.

This in-vehicle system may be so constructed that the following is implemented: when the warning lamp on the meter panel lights up or flashes, the controlling means reads detailed warning lamp information stored in a detailed warning lamp information storing means; it thereby causes the notifying means to provide detailed warning lamp information about the lighted or flashing warning lamp. This makes it possible to implement the following: detailed warning lamp information is stored in the detailed warning lamp information storing means in advance, and the user can be thereby swiftly informed of the description of the content of the warning, coping strategies, and the like through the control solely of the in-vehicle system.

The in-vehicle system may be so constructed that the following is implemented: when the warning lamp on the meter panel lights up or flashes, the controlling means causes a communication line to be established between a first communicating means and the server system and the first communicating means to receive detailed warning lamp information from the server system; it thereby causes the notifying means to provide detailed warning lamp information about the lighted or flashing warning lamp. This makes it possible to implement the following: the communication line is established between the first communicating means and the server system, and the first communicating means is caused to receive detailed warning lamp information from the server system; the user can be thereby swiftly informed of the description of the content of the warning, coping strategies, and the like through the collaborative control of the in-vehicle system and the server system.

It is desirable that the controlling means should cause a displaying means to display detailed warning lamp information through the medium of characters and images. Thus, the user can be visually informed of the description of the content of warning, coping strategies, and the like.

The controlling means may cause the displaying means to display detailed warning lamp information through the use of a hyperlink function. Thus, the user can be visually informed of the description of the content of warning, coping strategies, and the like in the hyperlink style. This can enhance man-machine interface for users who are familiar with hyperlink functions.

The controlling means may cause the displaying means to display detailed warning lamp information through the use of an interaction function. Thus, the user can be visually informed of the description of the content of warning, coping strategies, and the like in an interactive manner. This can enhance man-machine interface for users who are familiar with the interaction functions.

The controlling means may be so constructed that the following is implemented: when the warning lamp on the meter panel lights up or flashes, it causes the displaying means to display detailed warning lamp information about the lighted or flashing warning lamp provided that a first predetermined operation is performed by the user. Thus, the user can be visually informed of the description of the content of warning, coping strategies, and the like by performing the first predetermined operation.

The displaying means is constructed of the display device of an automobile navigation system that displays the warning icon in conjunction with a warning lamp on the meter panel lighting up or flashing. The controlling means may be so constructed that the following is implemented: when the warning lamp on the meter panel lights up or flashes, it causes the display device of the automobile navigation system to display detailed warning lamp information about the lighted or flashing warning lamp provided that the warning icon displayed on the display device of the automobile navigation system is operated by the user. This operation is equivalent to the first predetermined operation. Thus, the user can be visually informed of the description of the content of warning, coping strategies, and the like by operating the warning icon displayed on the display device of the automobile navigation system. In this case, a dedicated display device for displaying the description of the content of warning, coping strategies, and the like is unnecessary, and the display device of the automobile navigation system can be effectively utilized.

The controlling means may be so constructed that the following is implemented: when the warning lamp on the meter panel lights up or flashes, it causes the communication line to be established between a second communicating means and an operator system or a dealer system provided that a second predetermined operation is performed by the user. Thus, the communication line can be established between the second communicating means and the operator system or the dealer system by the user performing the second predetermined operation. The user can implement the following, for example: the user can download a specific piece of applications software from the server system to the in-vehicle system under a direction from the operator system or the dealer system; and the user can talk with an operator manning the operator system or dealer's personnel manning the dealer system to obtain help.

The displaying means is constructed of the display device of the automobile navigation system that displays a help icon in conjunction with the warning lamp on the meter panel lighting up or flashing. The controlling means may be so constructed that the following is implemented: when the warning lamp on the meter panel lights up or flashes, it causes the communication line to be established between the second communicating means and the operator system or the dealer system provided that the help icon displayed on the display device of the automobile navigation system is operated by the user. This operation is equivalent to the second predetermined operation. Thus, the communication line can be established between the second communicating means and the operator system or the dealer system by the user operating the help icon displayed on the display device of the automobile navigation system. The user can implement the following, for example: the user can download the specific piece of applications software from the server system to the in-vehicle system under the direction from the operator system or the dealer system; and the user can talk with an operator manning the operator system or dealer's personnel manning the dealer system to obtain help.

The controlling means may be so constructed that the following is implemented: when the warning lamp on the meter panel lights up or flashes, it causes the notifying means to provide detailed warning lamp information about the lighted or flashing warning lamp; at the same time, it determines whether or not the emergency stop is required; when it detects that the emergency stop is required, it causes the notifying means to notify the user that an emergency stop is required. Thus, when it is detected that the emergency stop is required, the user can be swiftly informed of the necessity for the emergency stop.

When the controlling means detects that an emergency stop is required, it may cause the automobile navigation system to search for a route with a place where the emergency stop can be made taken as the destination and to provide route guidance in accordance with the retrieved route. Thus, it is possible to guide the user to the place where the emergency stop can be made by the route retrieved by the automobile navigation system.

The controlling means may implement the following: when it is detected that an operation for making the emergency stop is not performed by the user, it carries out processing to prompt the user to perform the operation for making the emergency stop. (Examples of such processing include forcibly applying vibration to a steering wheel or tires to the extent that driving is not disturbed.) This can prompt the user to perform the operation for making an emergency stop.

The controlling means may be so constructed that the following is implemented: it holds history information on the state of a user vehicle; when the warning lamp on the meter panel lights up or flashes, it causes the notifying means to provide detailed warning lamp information about the lighted or flashing warning lamp; at the same time, it causes the notifying means to provide history information on the state of the user vehicle. Thus, the user can be swiftly informed of history information on the state of the user vehicle as well.

The detailed warning lamp information notification system related to warning lamps according to the invention is so constructed that the following is implemented: when the warning lamp on the meter panel lights up or flashes, the in-vehicle system transmits a detailed warning lamp information request signal to the server system; the server system holds detailed warning lamp information about the warning lamps on the meter panel; when the detailed warning lamp information request signal is received from the in-vehicle system, the server system transmits detailed warning lamp information to the in-vehicle system; when the detailed warning lamp information is received from the server, the in-vehicle system provides the received detailed warning lamp information. Thus, when the warning lamp on the meter panel lights up or flashes, detailed warning lamp information from the server system is received by the in-vehicle system through collaboration between the in-vehicle system and the server system. The user can be thereby swiftly informed of the description of the content of warning, coping strategies, and the like.

In this detailed warning lamp information notification system related to warning lamps, the server system may be so constructed that the following is implemented: it holds information on failure in vehicles of the same model as well as history information on the state of the user vehicle; when the detailed warning lamp information request signal is received from the in-vehicle system, the server system transmits to the in-vehicle system information on failure in vehicles of the same model as well as history information on the state of the user vehicle. Thus, history information on the state of the user vehicle and information on failure in vehicles of the same model from the server system are received by the in-vehicle system. The user can be thereby swiftly informed of the information on failure in vehicles of the same model as well as the history information on the state of the user vehicle.

The server system according to the invention is used in the detailed warning lamp information notification system, together with the in-vehicle system that can be mounted in the vehicle and is so constructed that the warning lamp on the meter panel lights up or flashes in correspondence with the occurrence of an anomaly in the vehicle. This server system holds the detailed warning lamp information related to the warning lamps on the meter panel and, when the detailed warning lamp information request signal is received from the in-vehicle system, it transmits detailed warning lamp information to the in-vehicle system. Thus, in the in-vehicle system, the following is implemented in such an environment that the server system is used together with the in-vehicle system: when the warning lamp on the meter panel lights up or flashes, detailed warning lamp information is received from the server system, and the user can be thereby swiftly informed of the description of the content of the warning, coping strategies, and the like.

This server system may be so constructed that the following is implemented: it holds information on failure in vehicles of the same model as well as history information on the state of the user vehicle; and when the detailed warning lamp information request signal is received from the in-vehicle system, it transmits to the in-vehicle system information on failure in vehicles of the same model as well as history information on the state of the user vehicle. Thus, in the in-vehicle system, the following is implemented when the warning lamp on the meter panel lights up or flashes: history information on the state of the user vehicle and information on failure in vehicles of the same model from the server system are received by the in-vehicle system; the user can be thereby swiftly provided with the information on failure in vehicles of the same model as well as the history information on the state of the user vehicle.

BRIEF DESCRIPTION OF DRAWINGS

FIG. 2 are drawings schematically illustrating a mode in which a warning icon is displayed on a display device;

FIG. 6 are drawings schematically illustrating a mode in which detailed warning lamp information is displayed through the utilization of a hyperlink function;

FIG. 10 are drawings schematically illustrating a mode in which a help icon is displayed on a display device;

BEST MODE FOR CARRYING OUT THE INVENTION

First Embodiment

Figure 1:
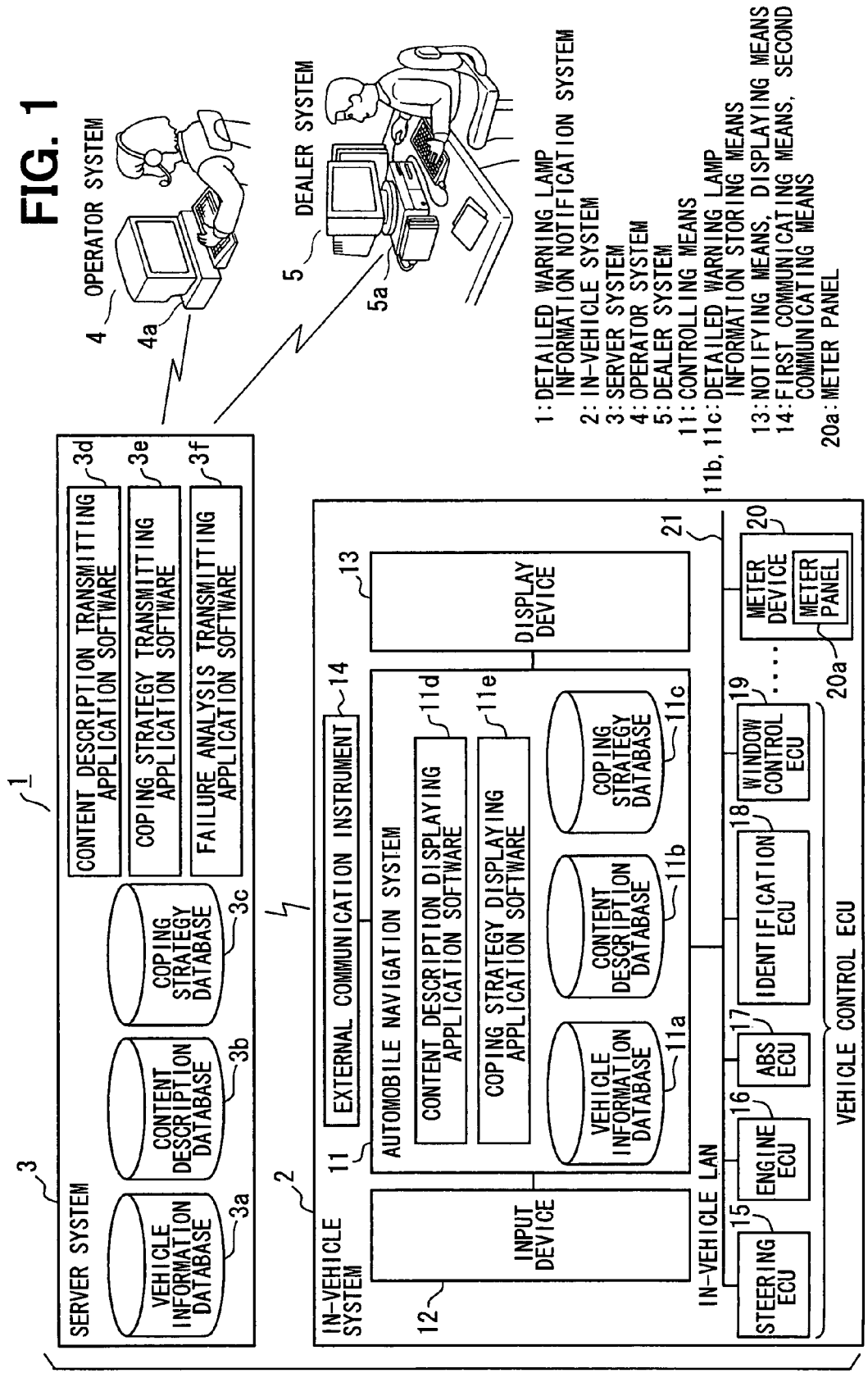
FIG. 1 is a functional block diagram illustrating the overall configuration of a first embodiment of the invention.
Figure 3:
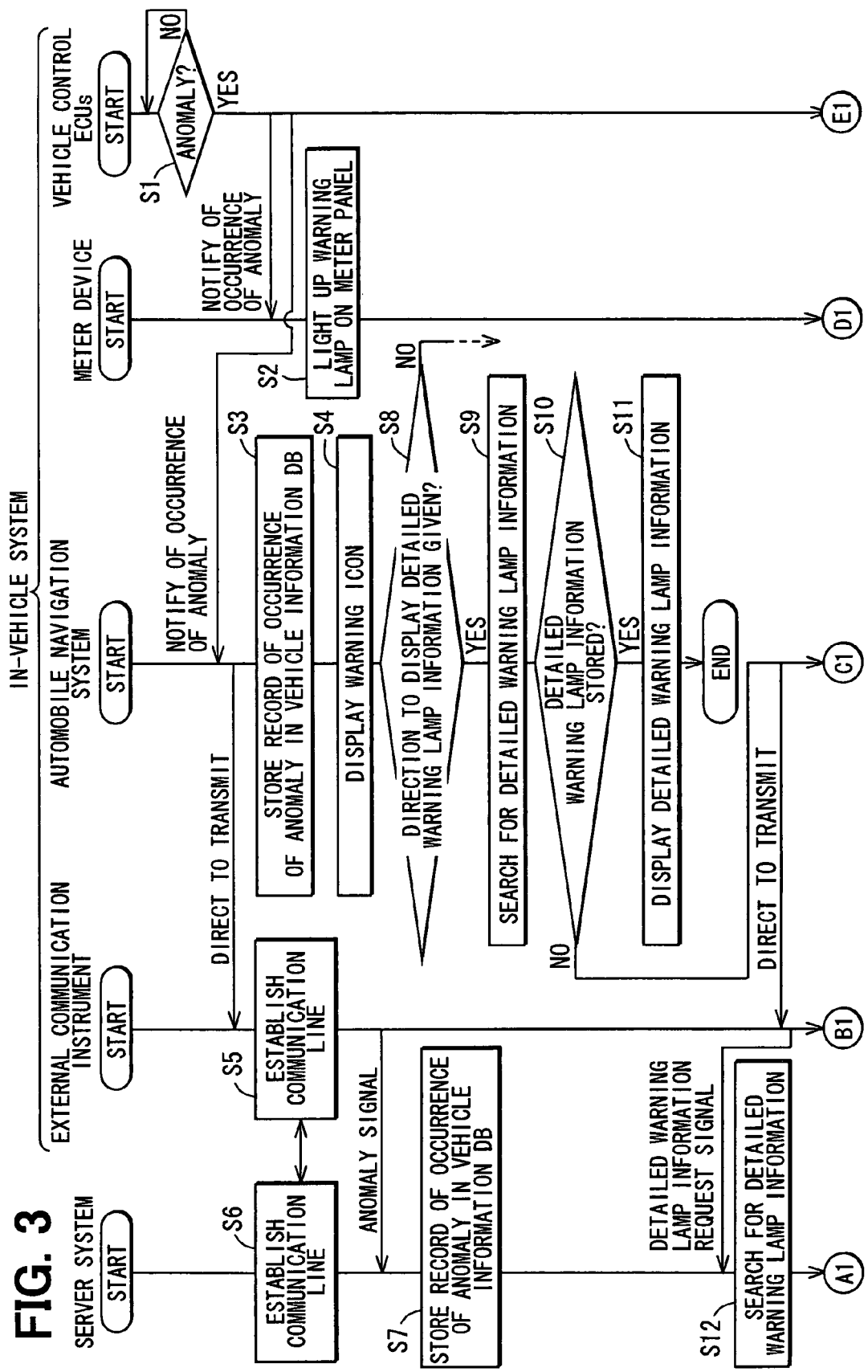
FIG. 3 is a first sequence diagram illustrating the flow of processing in an entire system.
Figure 4:
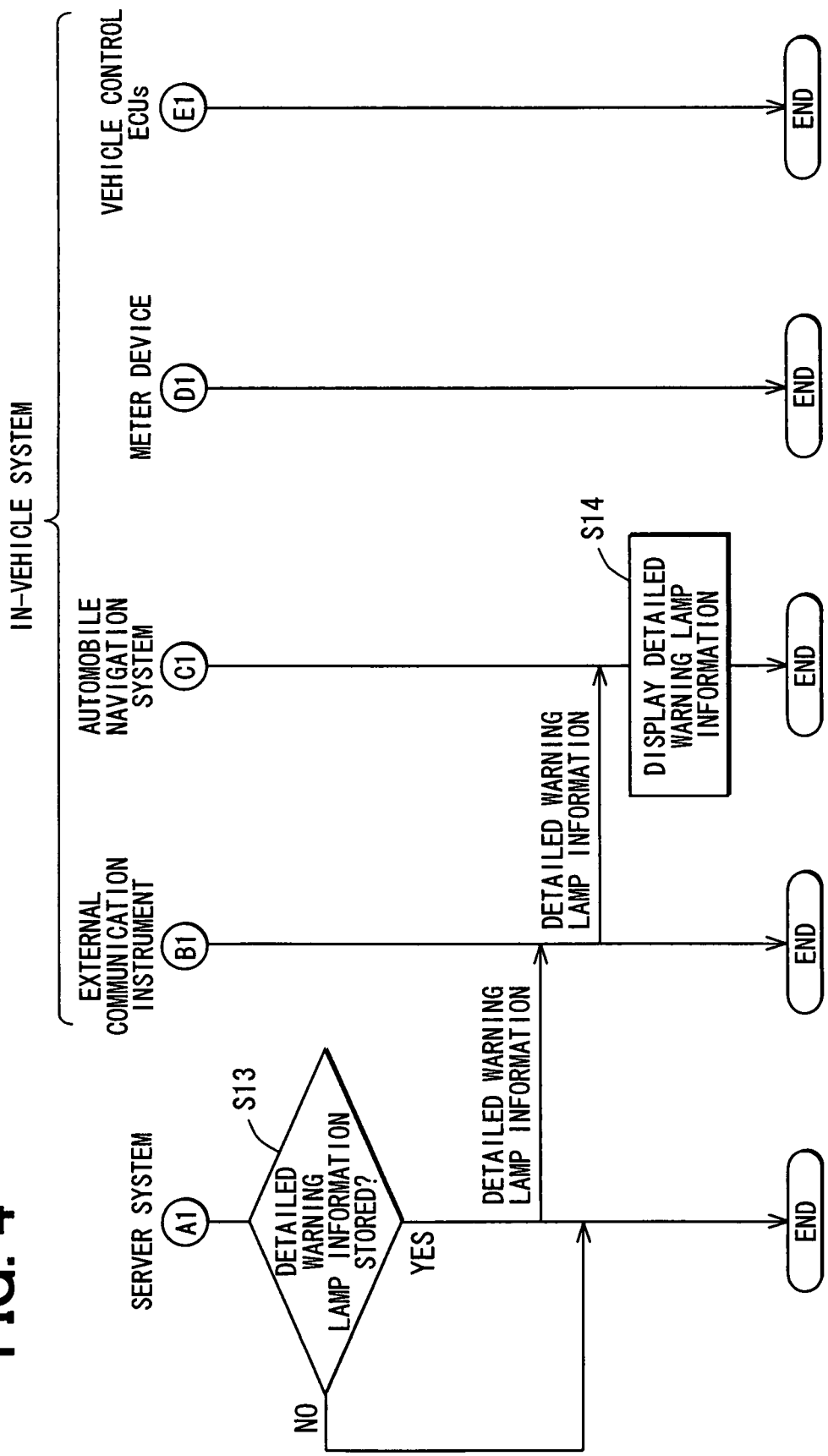
FIG. 4 is a second sequence diagram illustrating the flow of processing in the entire system.

Hereafter, description will be given to a first embodiment of the invention with reference to FIGS. 1 to 10. FIG. 1 schematically illustrates the overall configuration of a detailed warning lamp information notification system.

The detailed warning lamp information notification system 1 is so constructed that the following are communicatably connected with one another through a network (including the Internet, intranet, and the like): the in-vehicle system 2 mounted in a vehicle; the server system 3 installed in a central office; an operator system 4 manned by an operator; and a dealer system 5 manned by dealer's personnel.

The in-vehicle system 2 includes: an automobile navigation system 11 (controlling means in the invention); an input device 12; a display device 13 (notifying means and displaying means in the invention); and an external communication instrument 14 (first communicating means and second communicating means in the invention). Further, the in-vehicle system is so constructed that vehicle control ECUs 15 to 19, such as a steering ECU 15, an engine ECU 16, an Antilock Brake System (ABS) ECU 17, an identification ECU 18, and a window control ECU 19, and a meter device 20 connected with the automobile navigation system 11 through an in-vehicle LAN 21.

When it is detected that an anomaly has occurred in the relevant vehicle, the vehicle control ECUs 15 to 19 inform the meter device 20 and the automobile navigation system 11 of the anomaly through the in-vehicle LAN 21. More specific description will be given. When it is detected that any anomaly occurs in the pressure of engine oil, a charging system, or the like, for example, the engine ECU 16 informs the meter device 20 and the automobile navigation system 11 of the occurrence of the anomaly in the pressure of engine oil, the charging system, or the like through the in-vehicle LAN 21.

The meter device 20 is constructed that it includes as a component a meter panel 20a installed in front of the driver's seat. When it is informed of the occurrence of any anomaly from the vehicle control ECUs 15 to 19, it lights up the warning lamp on the meter panel 20a corresponding to the content of the informed anomaly. That is, when the meter device 20 is informed of the occurrence of any anomaly in the pressure of engine oil from the engine ECU 16, for example, it lights up the oil pressure warning lamp on the meter panel 20a. When it is informed of the occurrence of any anomaly in the charging system from the engine ECU 16, for example, it lights up a charge warning lamp on the meter panel 20a.

In addition to the oil pressure warning lamp and the charge warning lamp, the meter panel 20a is provided with the following: an exhaust temperature warning lamp that lights up when any anomaly occurs in the temperature of a catalyst device; an engine warning lamp that lights up when any anomaly occurs in an engine control system; a door ajar warning lamp that lights up when a door is ajar (a door is not completely closed); a brake warning lamp that lights up when a parking brake is applied; a seat belt warning lamp that lights up when the driver's seat belt is not worn.

The automobile navigation system 11 carries out all aspects of navigating operation, such as a function of locating the current position based on a GPS receiver and the like, a function of displaying maps, and a route search function and a route guidance function. The input device 12 is so constructed that it can accept a user's operation. The display device 13 is so constructed that it can display warning icons having substantially the same functions as the warning lamps provided on the meter panel 20a do. In the case of the automobile navigation system 11, operation is performed as follows: when it is informed of the occurrence of any anomaly from the vehicle control ECUs 15 to 19, it causes the display device 13 to display the warning icon corresponding to the content of the informed anomaly. More specific description will be given. For example, when it is notified from the engine ECU 16 that an anomaly has occurred in the pressure of engine oil while route guidance is being provided, the automobile navigation system 11 causes the display device 13 to display an oil pressure warning icon (shown by "A"), as illustrated in FIG. 2(a). When it is notified from the engine ECU 16 that an anomaly has occurred in the charging system, the automobile navigation system causes the display device 13 to display a charge warning icon (shown by "B"), as illustrated in FIG. 2(b).

The warning icons the automobile navigation system 11 can cause the display device 13 to display are not only the oil pressure warning icon or the charge warning icon. It can also cause the display device to display the following corresponding to the warning lamps provided on the meter panel 20a: an exhaust temperature warning icon (shown by "C"); an engine warning icon (shown by "D"); a door ajar warning icon (shown by "E"); a brake warning icon (shown by "F"); a seat belt warning icon (shown by "G"); and the like.

Further, the automobile navigation system 11 includes: a vehicle information database 11a that can hold the history of the occurrences of anomalies on a vehicle-by-vehicle basis as vehicle information; a content description database 11b (detailed warning lamp information storing means in the invention) that can hold data related to the description of the content of warning; and a coping strategy database 11c (detailed warning lamp information storing means in the invention) that can hold data related to strategies to cope with warning. Further, the automobile navigation system is so constructed that it can execute the following pieces of software: content description displaying application software 11d for causing the display device 13 to display data related to the description of the content of the warning stored in the content description database 11b; and a coping strategy displaying application software 11e for causing the display device 13 to display data related to the strategies to cope with warning stored in the coping strategy database 11c. The detailed warning lamp information in the present invention is equivalent to the above-mentioned description of content of warning and strategies to cope with warning in this embodiment.

The display device 13 is so constructed that it has the following functions: a display function for displaying the above-mentioned various warning icons, description of the content of warning, and strategies to cope with warning; and an operation accepting function that displays various button keys and accepts a user's operation. More specific description will be given. When the display device 13 is directed to display some information by the automobile navigation system 11, it displays the specified information. Further, when any button key is operated (touched), the display device notifies the automobile navigation system 11 of the content of that operation.

The external communication instrument 14 is constructed of, for example, a cellular phone that can be attached to and detached from the automobile navigation system 11. It establishes a communication line between it and the server system 3, operator system 4, or dealer system 5 and communicates with them under a direction from the automobile navigation system 11. The external communication instrument 14 need not be constructed of the cellular phone and may be, for example, something incorporated as a communication module in the automobile navigation system 11.

Similarly with the automobile navigation system 11 mentioned above, the server system 3 includes the following databases: a vehicle information database 3a that can hold the history of the occurrences of anomalies on a vehicle-by-vehicle basis as vehicle information; a content description database 3b that can hold data related to the description of the content of warning; and a coping strategy database 3c that can hold data related to strategies to cope with warning. Further, the server system is so constructed that it can execute the following pieces of software: content description transmitting application software 3d for transmitting to the in-vehicle system 2 data related to the description of the content of warning, stored in the content description database 3b; coping strategy transmitting application software 3e for transmitting to the in-vehicle system 2 data related to strategies to cope with warning, stored in the coping strategy database 3c; and failure analysis transmitting application software 3f for transmitting data required for failure analyses to the in-vehicle system 2.

In the above-mentioned construction, the server system 3, operator system 4, and dealer system 5 are linked with one another. An operator can perform the following by operating an computer terminal 4a in the operator system 4: the operator can execute the failure analysis transmitting application software 3f in the server system 3 to transmit failure analysis application software from the server system 3 to the in-vehicle system 2. The dealer's personnel can perform the following by operating a computer terminal 5a in the dealer system 5: they can execute the failure analysis transmitting application software 3f in the server system 3 to transmit failure analysis application software from the server system 3 to the in-vehicle system 2. A user can choose whether to obtain help from an operator or dealer's personnel.

Description will be given to the action of the above-mentioned construction with reference to FIGS. 3 to 7(b). Description will be given in the order of (1) cases where the user does not obtain help from operator or dealer's personnel and (2) cases where the user obtains help from operator or dealer's personnel.

(1) Cases where the User does not Obtain Help from Operator or Dealer's Personnel First, description will be given to "cases where user does not obtain help from operator or dealer's personnel" with reference to FIGS. 3 to 7(b).

The vehicle control ECUs 15 to 19 monitor whether or not any anomaly has occurred in the relevant vehicle (Step S1). When any of the ECUs detects that an anomaly has occurred in the vehicle ("YES" at Step S1), it notifies the meter device 20 and the automobile navigation system 11 of the occurrence of the anomaly. When the meter device 20 is notified of the occurrence of the anomaly from the one of the vehicle control ECUs 15 to 19, it lights up the corresponding warning lamp on the meter panel 20a (Step S2). When the automobile navigation system 11 is notified of the occurrence of the anomaly from the one of the vehicle control ECUs 15 to 19, it directs the external communication instrument 14 to transmit an anomaly signal. At the same time, the automobile navigation system stores the record of the occurrence of the anomaly in the vehicle information database 11a (Step S3), and causes the display device 13 to display the warning icon (Step S4).

When the external communication instrument 14 is directed to transmit the anomaly signal by the automobile navigation system 11, it establishes the communication line between it and the server system 3 (Steps S5 and S6), and transmits an anomaly signal to the server system 3. When the server system 3 receives the anomaly signal from the in-vehicle system 2, it analyses the received anomaly signal and stores the record of the occurrence of the anomaly in the vehicle information database 3a (Step S7).

Thus, for example, when the engine ECU 16 detects that an anomaly has occurred in the pressure of engine oil and notifies the meter device 20 and the automobile navigation system 11 of the occurrence of the anomaly in the pressure of the engine oil, the following takes place: the oil pressure warning lamp on the meter panel 20a lights up, and the oil pressure warning icon is displayed on the display device 13. Thus, the user visually perceives that the oil pressure warning lamp on the meter panel 20a is on, and further visually perceive that the oil pressure warning icon is displayed on the display device 13. Further, the fact that an anomaly has occurred in the pressure of the engine oil is stored as the record of the occurrence of an anomaly in the vehicle information database 3a of the server system 3 and in the vehicle information database 11a of the automobile navigation system 11.

In cases where the user sees a lighted warning lamp on the meter panel 20a or a warning icon displayed on the display device 13 and can pinpoint what is faulty or poorly maintained, the user takes the following action: the user leaves the situation as it is in the meantime and then appropriately copes with the anomaly by himself/herself. In cases where the user sees a lighted warning lamp on the meter panel 20a or the warning icon displayed on the display device 13 and cannot pinpoint what is faulty or poorly maintained, the user takes the following action: the user operates (touches) the warning icon displayed on the display device 13 (performs the first predetermined operation in the invention); the user thereby gives an instruction to display the detailed warning lamp information about the warning lamp.

After causing the display device 13 to display the warning icon, the automobile navigation system 11 monitors whether or not the displayed warning icon has been operated. The automobile navigation system thereby monitors whether or not the instruction to display the detailed warning lamp information about the warning lamp has been given (Step S8). When the automobile navigation system 11 detects that the instruction to display the detailed warning lamp information about the warning lamp has been given ("YES" at Step S8), it carries out the following processing: it searches the content description database 11b for the description of the content of warning and the coping strategy database 11c for strategies to cope with warning (Step S9). It determines whether or not appropriate detailed warning lamp information is stored in the content description database 11b or the coping strategy database 11c (Step S10).

When the automobile navigation system 11 detects that the appropriate detailed warning lamp information is stored in the content description database 11b or the coping strategy database 11c ("YES" at Step S10), it carries out the following processing: the automobile navigation system reads the appropriate detailed warning lamp information from the content description database 11b and the coping strategy database 11c and causes the display device 13 to display it (Step S11).

Figure 5:
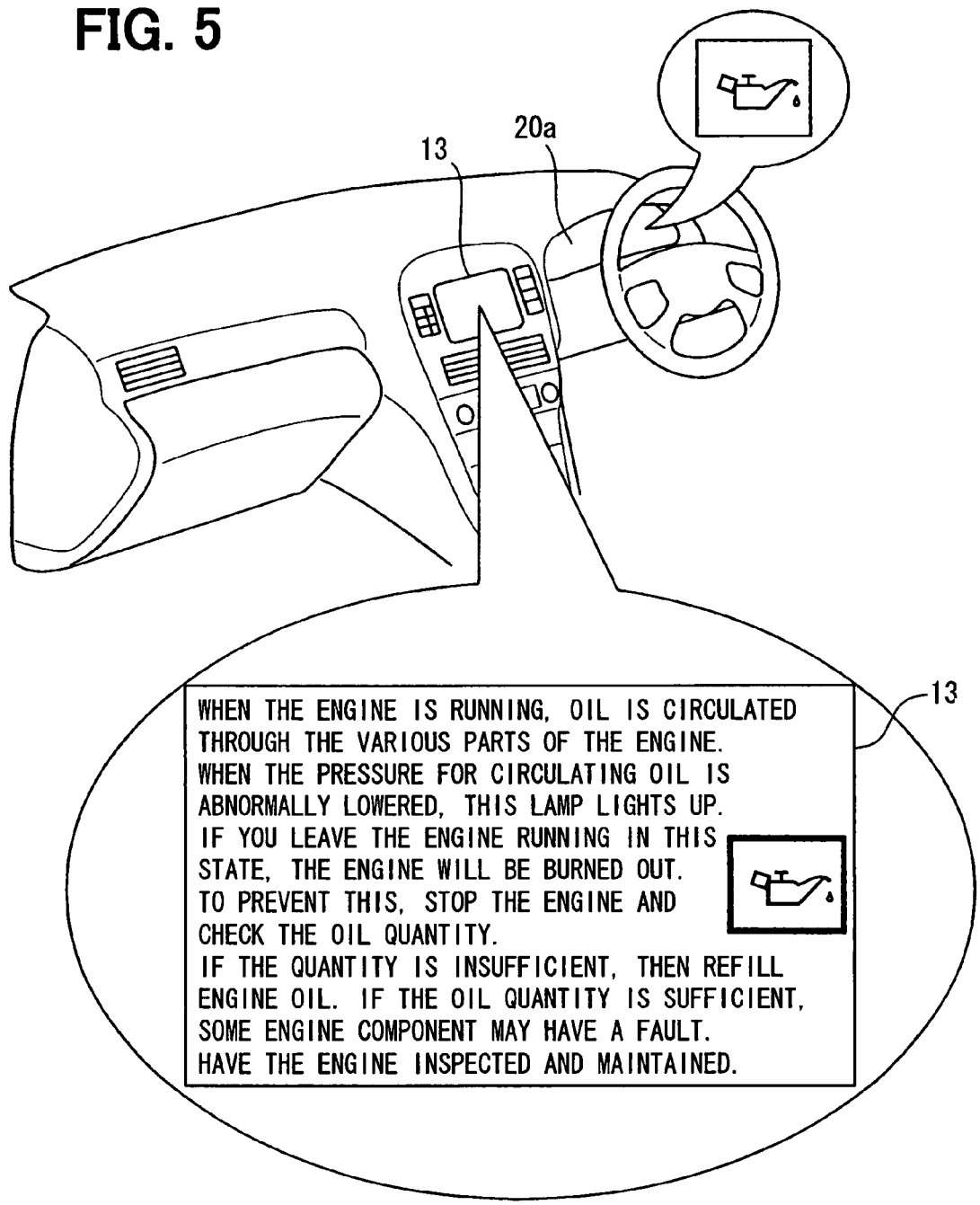
FIG. 5 is a drawing schematically illustrating a mode in which detailed warning lamp information is displayed on a display device at the same time as a warning lamp on a meter panel lights up.
Figure 7:
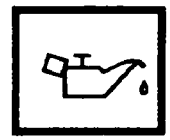
FIG. 7 are drawings schematically illustrating a mode in which detailed warning lamp information is displayed through the use of an interaction function.

The following is implemented by a series of the above-mentioned processing: in cases where the description of the content of warning that an anomaly has occurred in the pressure of the engine oil and coping strategies for it are stored in the content description database 11b and the coping strategy database 11c, the following takes place: as illustrated in FIG. 5, the description the content of the warning and coping strategies are displayed; and the user can understand the description of the content of the warning and the coping strategies and can pinpoint what is faulty or poorly maintained.

In cases where the automobile navigation system 11 detects that appropriate detailed warning lamp information about the warning lamp is not stored in the content description database 11b or the coping strategy database 11c ("NO" at Step S10), it carries out the following processing: the automobile navigation system directs the external communication instrument 14 to transmit the detailed warning lamp information request signal; when the external communication instrument 14 is directed to transmit the detailed warning lamp information request signal by the automobile navigation system 11, it transmits the detailed warning lamp information request signal to the server system 3.

When the server system 3 receives the detailed warning lamp information request signal from the in-vehicle system 2, it carries out the following processing: the server system searches the content description database 3b for the description of the content of warning and the coping strategy database 3c for coping strategies (Step S12); then, it determines whether or not appropriate detailed warning lamp information is stored in the content description database 3b or the coping strategy database 3c (Step S13). When the server system 3 detects that appropriate detailed warning lamp information is stored in the content description database 11b or the coping strategy database 11c ("YES" at Step S13), it carries out the following processing: the server system reads the appropriate detailed warning lamp information from the content description database 11b and the coping strategy database 11c and transmits it to the in-vehicle system 2.

When the external communication instrument 14 receives the detailed warning lamp information about the warning lamp from the server system 3, it outputs the received detailed warning lamp information to the automobile navigation system 11. When the automobile navigation system 11 is inputted with the detailed warning lamp information from the in-vehicle system 2, it causes the display device 13 to display the inputted detailed warning lamp information (Step S14).

The following is implemented by a series of the above-mentioned processing, even when the description of the content of warning that the anomaly has occurred in the pressure of the engine oil or the coping strategies are not stored in the content description database 11b or the coping strategy database 11c, for example: the description of the content of the warning and coping strategies are displayed as long as the description of the content of the warning and the coping strategies are stored in the content description database 3b and coping strategy database 3c of the server system 3. Thus, the user can understand the description of the content of the warning and the coping strategies and can pinpoint what is faulty or poorly maintained.

When causing the display device 13 to display detailed warning lamp information, the automobile navigation system 11 may utilize a hyperlink function. More specific description will be given. It will be assumed that the automobile navigation system 11 is displaying the description of the content of warning that the anomaly has occurred in the pressure of the engine oil and coping strategies, as illustrated in FIG. 6. When the automobile navigation system detects that the words of, for example, "check the oil quantity" have been specified by the user, it may subsequently display the description of the content of warning and coping strategies related to "checking the oil quantity."

When causing the display device 13 to display detailed warning lamp information, the automobile navigation system 11 may utilize an interaction function (Q&A function). More specific description will be given. It will be assumed that the automobile navigation system 11 is displaying the description of the content of warning that an anomaly has occurred in the pressure of the engine oil and coping strategies, as illustrated in FIGS. 7(a) and 7(b). At this time, the automobile navigation system may inquire of the user whether or not the user has stopped the engine or whether or not the user has checked the engine oil quantity. Further, the automobile navigation system may display the next piece of the detailed warning lamp information in correspondence with the user's response.

(2) Cases where the User Obtains Help from Operator or Dealer's Personnel

Figure 8:
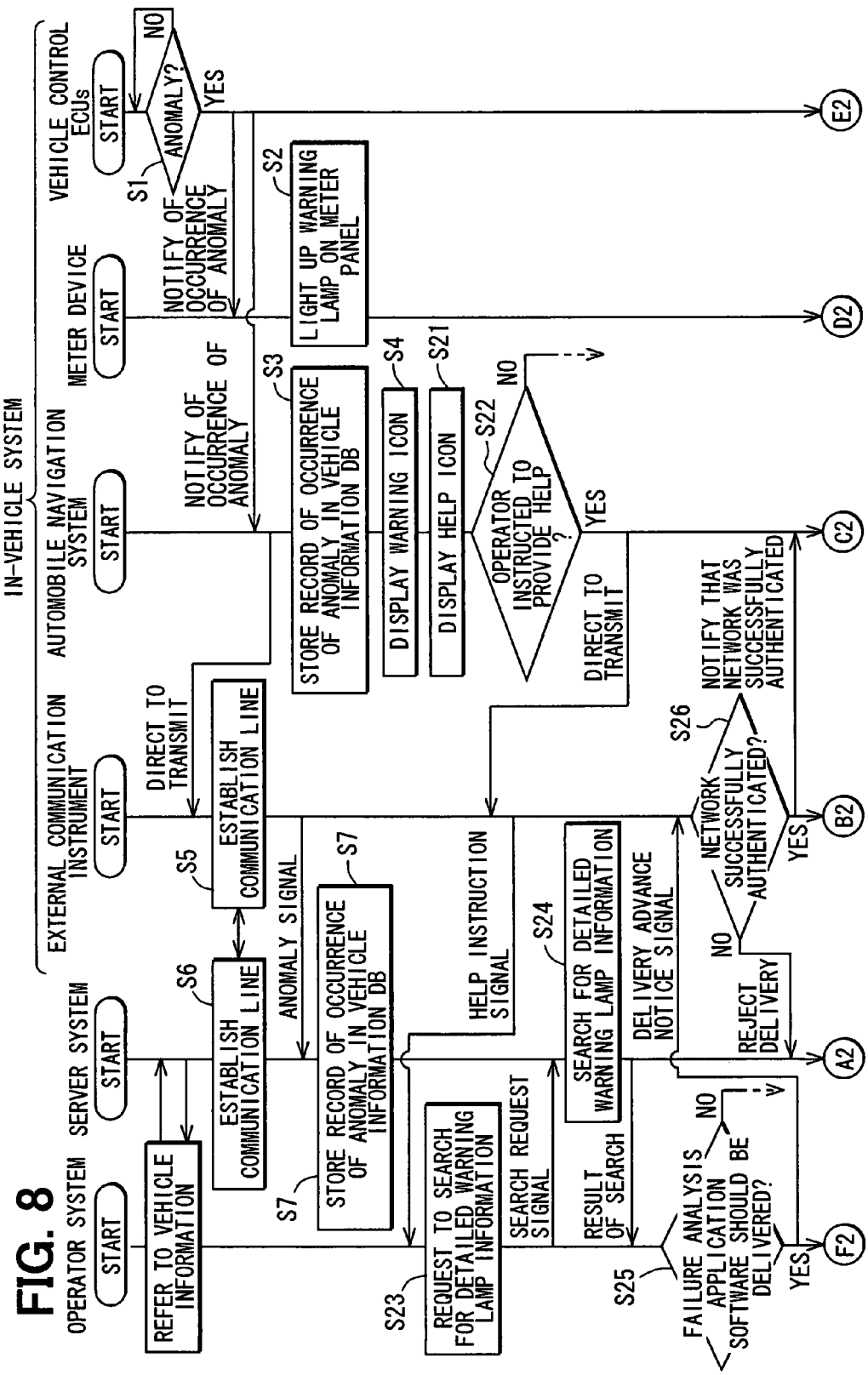
FIG. 8 is a third sequence diagram illustrating the flow of processing in an entire system.
Figure 9:
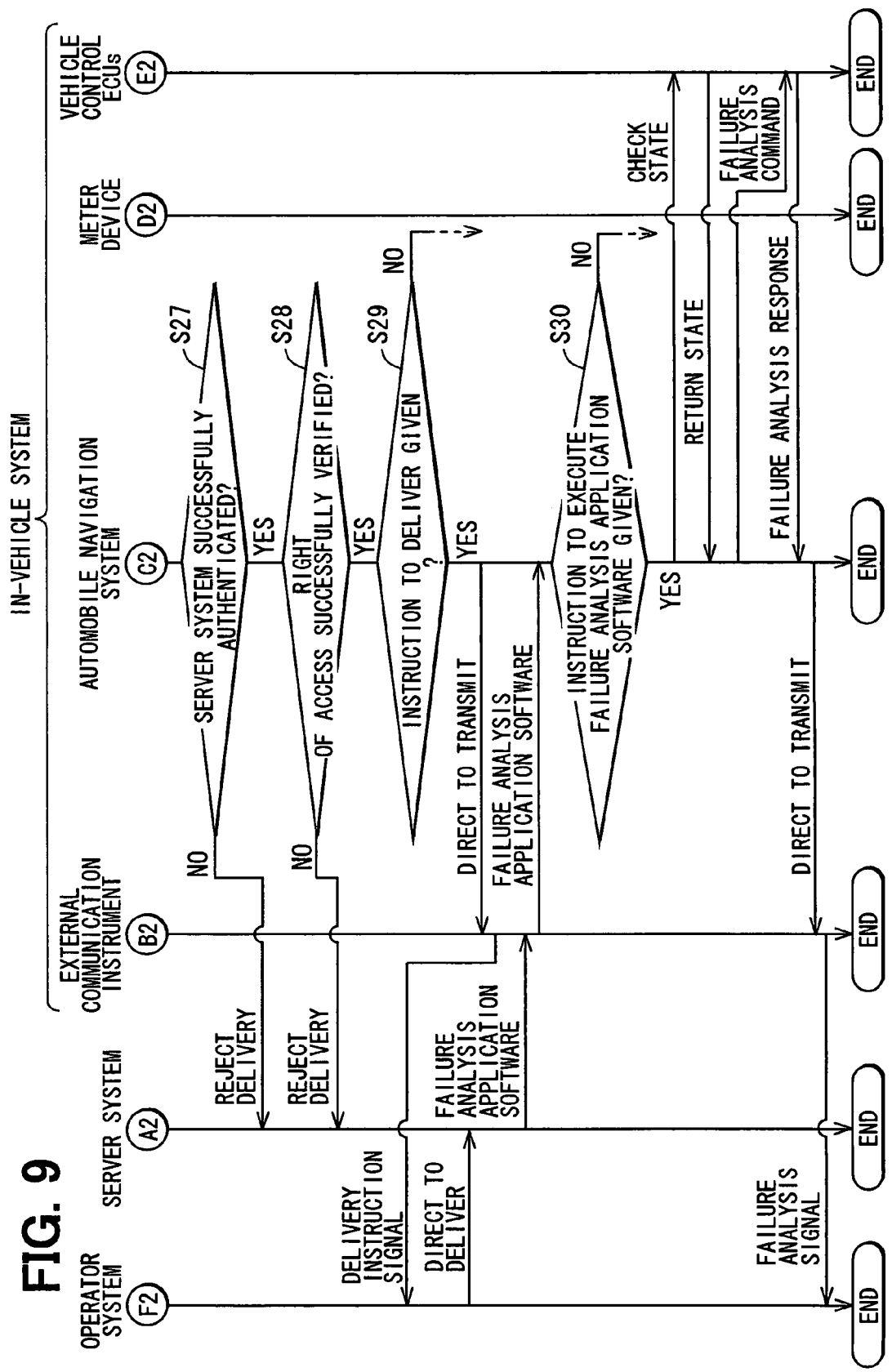
FIG. 9 is a fourth sequence diagram illustrating the flow of processing in the entire system.
Figure 11:
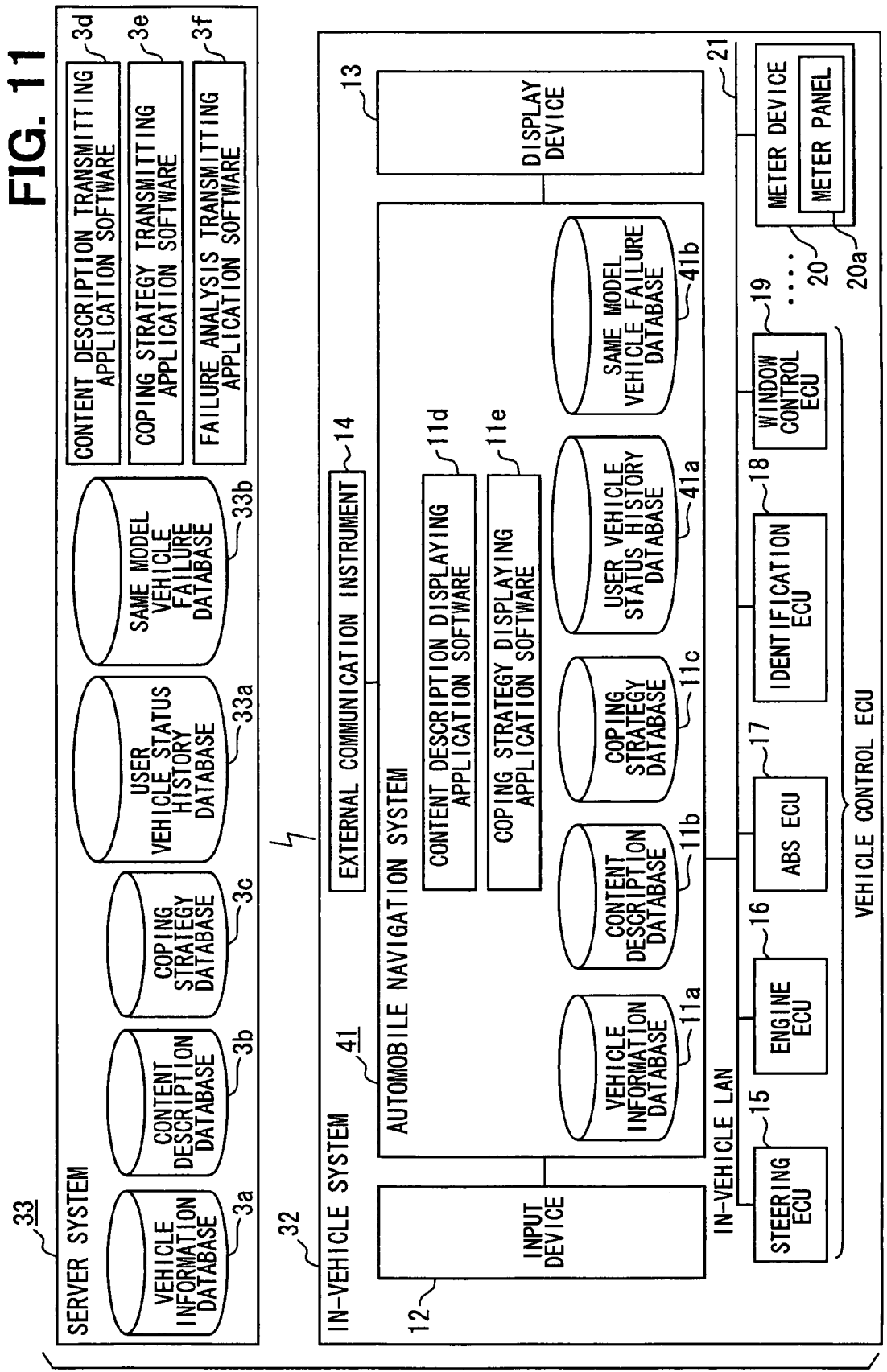
FIG. 11 is a functional block diagram illustrating the overall configuration of a second embodiment of the invention.

Description will be given to "cases where user obtains help from operator or dealer's personnel" with reference to FIGS. 8 to 10. Here, description will be given with the following cases taken as an example: cases where the user downloads failure analysis application software from the server system 3 to the in-vehicle system 2 according to an instruction from the operator manning the operator system 4. The following description also applies in cases where the user downloads failure analysis application software from the server system 3 to the in-vehicle system 2 according to the instruction from the dealer's personnel manning the dealer system 5. The following description is on the assumption that the automobile navigation system 11 causes the display device 13 to display the help icon (shown by "H") together with a warning icon, as illustrated in FIG. 10.

When the automobile navigation system 11 is informed of the occurrence of the anomaly from one of the vehicle control ECUs 15~19, it stores the record of the occurrence of the anomaly in the vehicle information database 11a (Step S3). At the same time, it causes the display device 13 to display the warning icon (Step S4) and causes the display device 13 to display the help icon (Step S21).

In cases where the user desires to obtain help from an operator manning the operator system 4, the user operates (touches) the help icon displayed on the display device 13. (The user performs the second predetermined operation in the invention). The user thereby instructs the operator to provide help.

After causing the display device 13 to display the help icon together with the warning icon, the automobile navigation system 11 monitors whether or not the displayed help icon has been operated. It thereby monitors whether or not the operator has been instructed to provide help (Step S22). When it is detected that the operator has been instructed to provide help ("YES" at Step S22), the automobile navigation system directs the external communication instrument 14 to transmit a help instruction signal. When the external communication instrument 14 is directed to transmit the help instruction signal by the automobile navigation system 11, it transmits a help instruction signal to the operator system 4.

When the operator system 4 receives the help instruction signal from the in-vehicle system 2, it transmits a search request signal to the server system 3, and requests the server system to search for detailed warning lamp information (Step S23). When the server system 3 receives the search request signal from the operator system 4, it searches the content description database 3b for the description of the content of the warning and the coping strategy database 3c for strategies to cope with the warning (Step S24). Then, the server system transmits the result of the search to the operator system 4.

At this time, the operator determines whether to deliver the failure analysis application software from the server system 3 to the in-vehicle system 2 based on the result of search from the server system 3 (Step S25). When the operator determines that the failure analysis application software should be delivered from the server system 3 to the in-vehicle system 2 ("YES" at Step S25), the operator transmits a delivery advance notice signal from the operator system 4 to the in-vehicle system 2.

When the external communication instrument 14 receives the delivery advance notice signal from the operator system 4, it authenticates the network (Step S26). When the network is not successfully authenticated ("NO" at Step S26), the external communication instrument rejects delivery of the failure analysis application software from the server system 3. When the network is successfully authenticated ("YES" at Step S26), the external communication instruments notifies the automobile navigation system 11 that the network was successfully authenticated.

When the automobile navigation system 11 is notified that the network was successfully authenticated by the external communication instrument 14 of the in-vehicle system 2, it authenticates the server system 3 (Step S27). When the server system 3 is not successfully authenticated ("NO" at Step S27), the automobile navigation system rejects delivery of the failure analysis application software from the server system 3. When the server system 3 is successfully authenticated ("YES" at Step S27), it verifies the right of access (Step S28).

When the right of access is not successfully verified ("NO" at Step S28), the automobile navigation system 11 rejects delivery of the failure analysis application software from the server system 3. When the right of access is successfully verified ("YES" at Step S28), the automobile navigation system determines whether to direct to deliver the failure analysis application software (Step S29). An example will be taken. In cases where the automobile navigation system 11 can analyze the causes of a fault based on an anomaly notification signal from the vehicle control ECUs 15 to 19, the automobile navigation system determines that the failure analysis application software need not be delivered. In cases where the automobile navigation system cannot analyze the causes of a fault, it determines that delivery of the failure analysis application software is required.

When the automobile navigation system 11 determines that an instruction to deliver the failure analysis application software is required ("YES" at Step S29), it directs the external communication instrument 14 to transmit a delivery instruction signal. When the external communication instrument 14 is directed to transmit the delivery instruction signal by the automobile navigation system 11, it transmits the delivery instruction signal to the operator system 4.

When the operator system 4 receives the delivery instruction signal from the in-vehicle system 2, it directs the server system 3 to deliver the failure analysis application software. When the server system 3 is directed to deliver the failure analysis application software by the operator system 4, it transmits the failure analysis application software to the in-vehicle system 2.

When the external communication instrument 14 receives the failure analysis application software from the server system 3, it outputs the received failure analysis application software to the automobile navigation system 11. When the automobile navigation system 11 is inputted with the failure analysis application software from the in-vehicle system 2, it monitors whether or not an instruction to execute the failure analysis application software has been given by the user (Step S30). When the automobile navigation system detects that an instruction to execute the failure analysis application software has been given ("YES" at Step S30), it checks the state of the vehicle control ECUs 15 to 19. When there are responses from the vehicle control ECUs 15 to 19, the automobile navigation system outputs a failure analysis command to the vehicle control ECUs 15 to 19.

When the automobile navigation system 11 is inputted with a failure analysis response from the vehicle control ECUs 15 to 19, it directs the external communication instrument 14 to transmit a failure analysis signal indicating the result of failure analysis. When the external communication instrument 14 is directed to transmit the failure analysis signal by the automobile navigation system 11, it transmits the failure analysis signal to the operator system 4.

The user can obtain help from the operator by a series of the above-mentioned processing. In the present embodiment, the user can download the failure analysis application software from the server system 3. The foregoing is the description of a case where the failure analysis application software is downloaded. Instead, the user can obtain help from the operator by talking with the operator.

As mentioned up to this point, the first embodiment is so constructed that the following is implemented: when the warning lamp on the meter panel 20a lights up in the detailed warning lamp information notification system 1, the description of the content of warning about the lighted warning lamp and coping strategies for the warning are displayed on the display device 13. Therefore, the user can be swiftly informed of the description of the content of warning and coping strategies. This can make it unnecessary for the user to spend time and effort looking for a service manual and opening the service manual and searching for appropriate pages, and can enhance user-friendliness.

The present embodiment is so constructed that in cases where the description of the content of warning and coping strategies are stored in the content description database 11b and the coping strategy database 11c, the stored description of the content of warning and coping strategies are read out and displayed. Therefore, the user can be swiftly informed of the description of the content of warning and coping strategies through the control solely of the in-vehicle system 2. The embodiment is so constructed that in cases where the description of the content of warning or coping strategies are not stored in the content description database 11b or the coping strategy database 11c, the following takes place: the description of the content of warning and coping strategies received from the server system 3 are displayed. Therefore, the user can be swiftly informed of the description of the content of warning and coping strategies through the collaborative control of the in-vehicle system 2 and the server system 3.

The present embodiment is so constructed that the description of the content of warning and coping strategies are displayed through the use of the hyperlink function. This can enhance man-machine interface for users who are familiar with hyperlink functions. Further, this embodiment is so constructed that the description of the content of warning and coping strategies are displayed through the use of an interaction function. This can enhance man-machine interface for users who are familiar with interaction functions. The present embodiment is so constructed that the communication line is established between the in-vehicle system and the operator system 4 or dealer system 5 by the user operating the help icon. Therefore, the user can obtain help from the operator or the dealer's personnel, and can also transmit the result of a failure analysis by the failure analysis application software to the server system 3.

Second Embodiment

Description will be given to a second embodiment of the invention with reference to FIG. 11 to FIG. 14. In the first embodiment, as described above, the automobile navigation system includes the vehicle information database 11a, content description database 11b, and coping strategy database 11c. In the in-vehicle system 32 in a second embodiment, the automobile navigation system 41 includes the following databases in addition to the above-mentioned databases: a user vehicle status history database 41a that can hold data related to the history of the state of a user vehicle; and a same model vehicle failure database 41b that can hold data related to failure in vehicles of the same model.

Similarly with the above-mentioned automobile navigation system 41, a server system 33 includes the following databases in addition to the vehicle information database 3a, the content description database 3b, and the coping strategy database 3c described with respect to the first embodiment: a user vehicle status history database 33a that can hold data related to the history of the state of a user vehicle; and a same model vehicle failure database 33b that can hold data related to failure in vehicles of the same model. Also, in this case, the in-vehicle system 32, the server system 33, the operator system manned by operators, and the dealer system manned by dealer's personnel are so constructed that they can communicate with one another through the network.

Data related to the history of the state of a user vehicle includes the following items:
  The level of importance and the degree of risk associated with warning lamps
  Numbers of times by which warning lamps light up (the total numbers of times during a period from the completion of servicing to the initiation of servicing with respect to a user vehicle)
  The record of places where the warning lamp lights up (places where the warning lamp lights up during a period from the completion of servicing to the initiation of servicing with respect to the user vehicle)
  Total mileage when the warning lamp lights up
  The record of the user's driving operation before and after the warning lamp lights up Data related to failure in vehicles of the same model includes the following items:
  The situation in which the warning lamp lights up in vehicles of the same model (including information on other user vehicles of the same model)
  Information on reasons why a warning lamp lights up in vehicles of the same model (including information on other user vehicles of the same model)

When the server system 33 receives the detailed warning lamp information request signal from the in-vehicle system 32 in this case, it carries out the following processing: it reads appropriate detailed warning lamp information from the content description database 11b and the coping strategy database 11c, and it transmits the information to the in-vehicle system 2. At the same time, it reads history information on the state of a user vehicle from the user vehicle status history database 33a and information on failure in vehicles of the same model from the same model vehicle failure database 33b, and transmits these pieces of information to the in-vehicle system 2.

When the external communication instrument 14 receives detailed warning lamp information about a warning lamp, history information on the state of the user vehicle, and information on failure in vehicles of the same model from the server system 33, it carries out the following processing: it outputs the received detailed warning lamp information, history information on the state of the user vehicle, and information on failure in vehicles of the same model to the automobile navigation system 41. When the automobile navigation system 41 is inputted with the warning lamp detailed information, history information on the state of the user vehicle, and information on failure in vehicles of the same model from the in-vehicle system 2, it carries out the following processing: it causes the display device 13 to display the inputted detailed warning lamp information, history information on the state of the user vehicle, and information on failure in vehicles of the same model.

The user can not only understand the description of the content of warning and coping strategies and pinpoint what is faulty or poorly maintained by a series of the above-mentioned processing. The user can also determine history information on the state of the user vehicle and information on failure in vehicles of the same model. Instead of causing the display device 13 to display the history information on the state of the user vehicle and the information on failure in vehicles of the same model received from the server system 33, the automobile navigation system 41 may carry out the following processing: it may read the history information on the state of the user vehicle from the user vehicle status history database 41a and the information on failure in vehicles of the same model from the same model vehicle failure database 41*b*; it may thereby cause the display device 13 to display the detailed warning lamp information and further cause the display device 13 to display the history information on the state of the user vehicle and the information on failure in vehicles of the same model read out.

Figure 12:
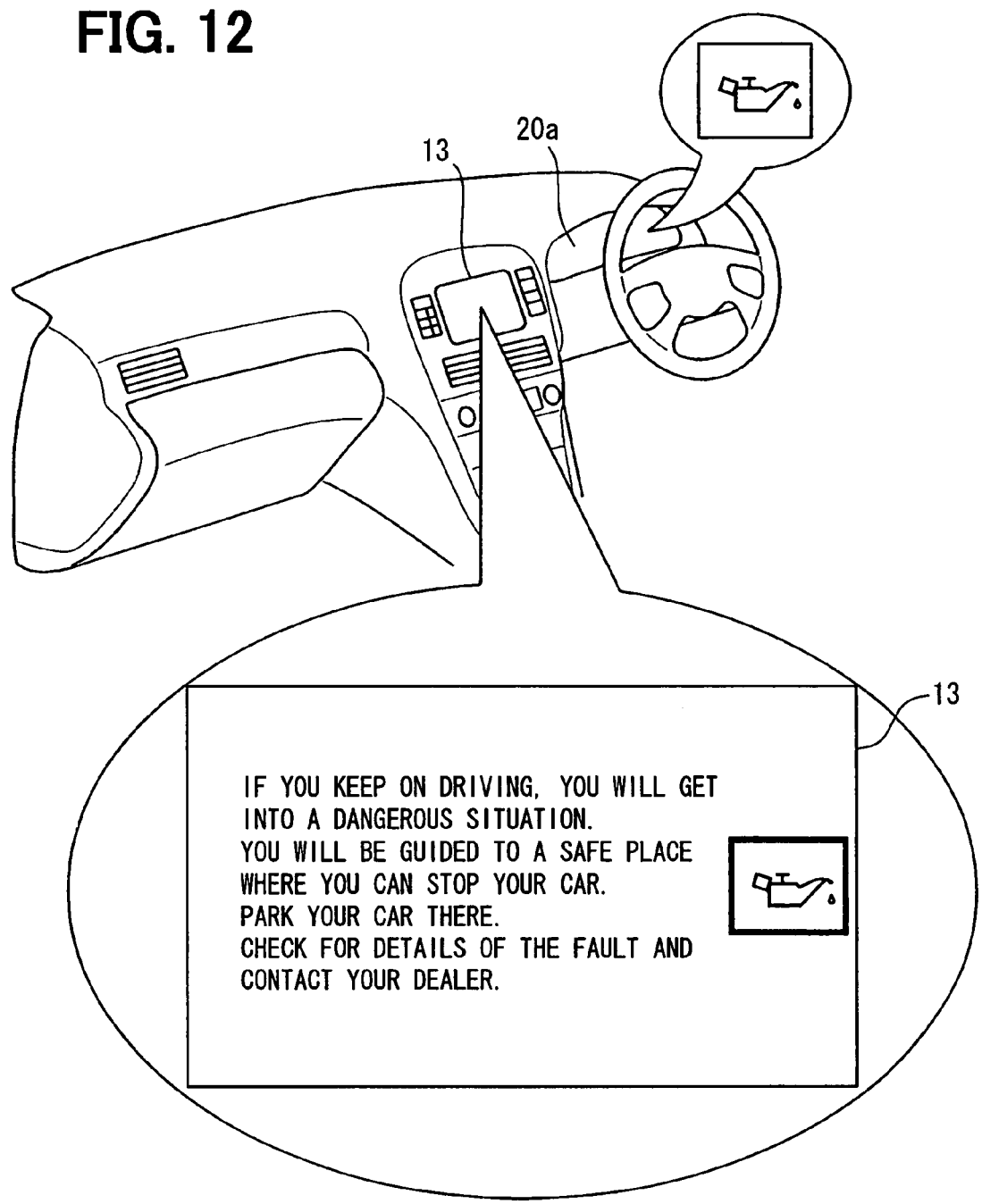
FIG. 12 is a drawing of the second embodiment corresponding to FIG. 5.
Figure 13:
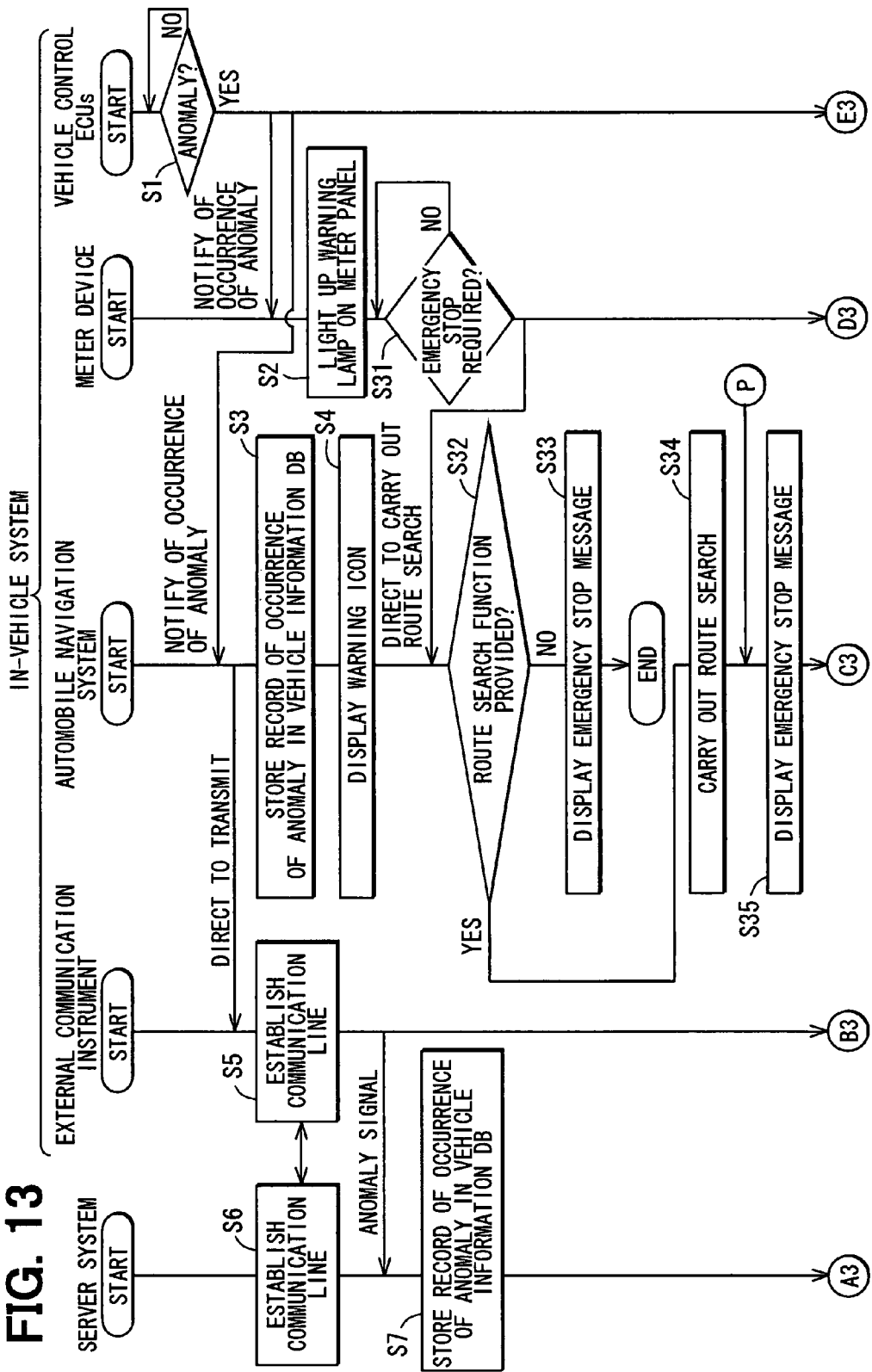
FIG. 13 is a fifth sequence diagram illustrating the flow of processing in an entire system.
Figure 14:
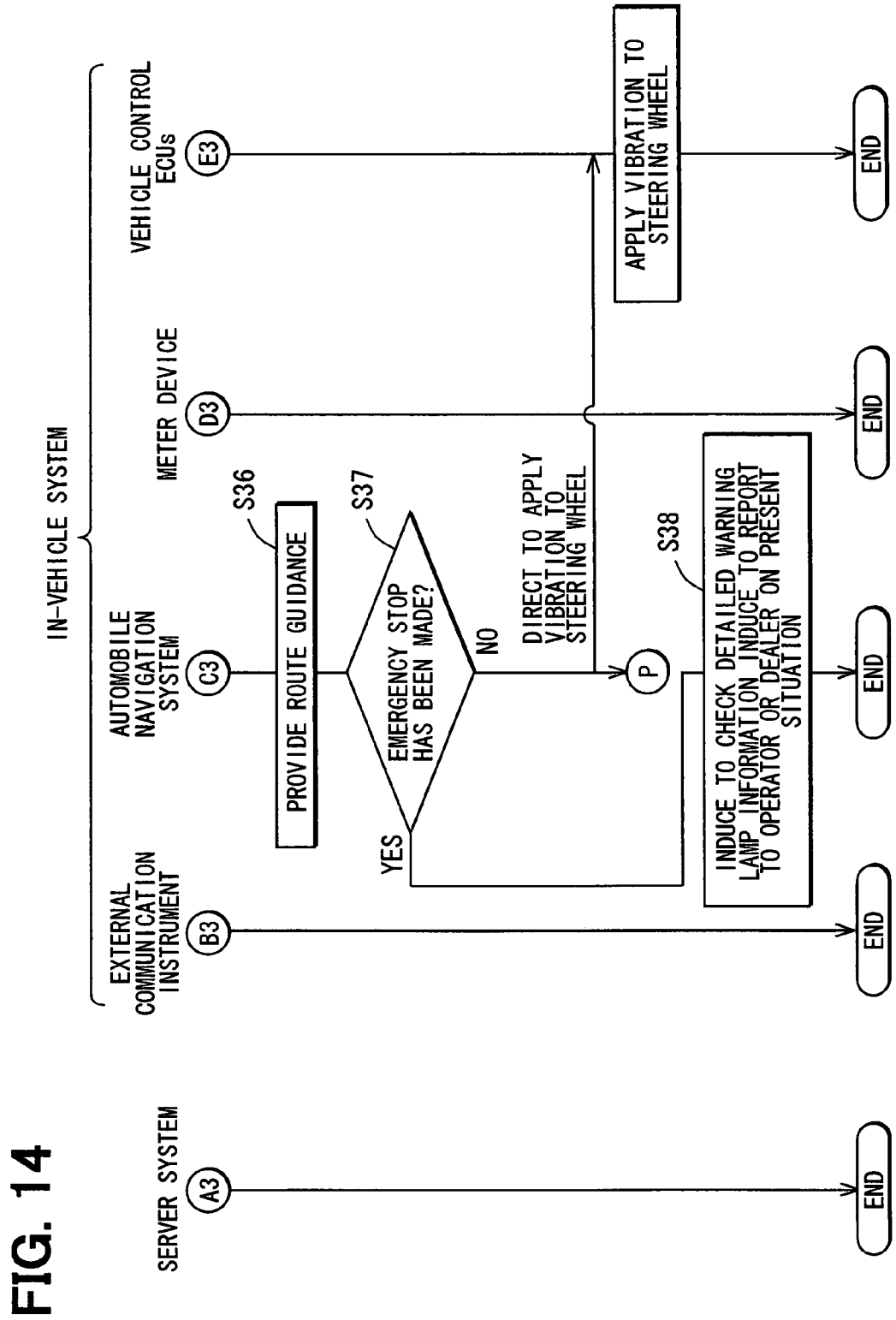
FIG. 14 is a sixth sequence diagram illustrating the flow of processing in the entire system.

The second embodiment also includes a function of determining whether or not an emergency stop is required. In this case, when the meter device 20 lights up a warning lamp on the meter panel 20*a*, it determines whether or not an emergency stop is required (Step S31). When the description of the content of warning is displayed on the display device 13 as illustrated in FIG. 12 and the meter device 20 detects that the emergency stop is required ("YES" at Step S31), the meter device directs the automobile navigation system 41 to carry out route search. When the automobile navigation system 41 is directed to carry out route search by the meter device 20, it carries out the following processing on a case-by-case basis: when it detects that it is not provided with a route search function ("NO" at Step S32), it causes the display device 13 to display an emergency stop message (Step S33).

Meanwhile, when the automobile navigation system 41 detects that it is provided with the route search function ("YES" at Step S32), it carries out route search for a safe place where the emergency stop can be made taken as the destination (Step S34). Further, the automobile navigation system causes the display device 13 to display the emergency stop message (Step S35) and provides route guidance in accordance with the retrieved route (Step S36). Then, the automobile navigation system 41 determines whether or not the relevant vehicle has come to the emergency stop (Step S37). When it detects that the relevant vehicle has not come to the emergency stop ("NO" at Step S37), it directs an appropriate vehicle control ECU to apply vibration to the steering wheel. When the appropriate vehicle control ECU is directed to apply vibration to the steering wheel by the automobile navigation system 41, it forcibly applies vibration to the steering wheel to the extent that driving is not disturbed. It thereby tactually notifies the user that if the user keeps on driving, the user will get into a dangerous situation. When the automobile navigation system 41 detects that the relevant vehicle has come to the emergency stop ("YES" at Step S37), it induces the user to check detailed warning lamp information and report to the operator or dealer on the present situation (Step S38).

As mentioned up to this point, the second embodiment is so constructed that the following is implemented: when the warning lamp on the meter panel 20*a* lights up, the description of the content of warning and the coping strategies about the lighted warning lamp are displayed on the display device 13; in addition, the history information on the state of the user vehicle and the information on failure in vehicles of the same model are also displayed on the display device 13. Therefore, the user can be swiftly informed not only of the description of the content of warning and coping strategies. The user can be swiftly informed also of the history information on the state of the user vehicle and the information on failure in vehicles of the same model.

Further, this embodiment is so constructed that the following is implemented: when a warning lamp on the meter panel 20*a* lights up, it is determined whether or not the emergency stop is required; when it is detected that the emergency stop is required, the necessity for the emergency stop is displayed on the display device 13. Therefore, the user can be swiftly informed of the necessity for the emergency stop. Further, the second embodiment is so constructed that the following is implemented: the automobile navigation system 41 is caused to carry out route search with the safe place where the emergency stop can be made taken as the destination, and to provide route guidance in accordance with the retrieved route. Therefore, the user can be guided to the safe place where the user can make the emergency stop. Further, the second embodiment is so constructed that the following is implemented: when it is detected that the user has not performed an operation for making the emergency stop, processing to prompt an operation for making an emergency stop, for example, application of vibration to the steering wheel to the extent that driving is not disturbed, is carried out. Therefore, the user can be prompted to perform an operation for making the emergency stop.

Other Embodiments

The invention is not limited to the above-mentioned embodiments, and it can be modified or expanded as described below.

For example, the in-vehicle system need not be constructed based on an automobile navigation system, and it may be constructed based on any other in-vehicle device.

The above-mentioned embodiments are so constructed that when the warning icon displayed on the display device is operated, the detailed warning lamp information is displayed. Instead, the invention may be so constructed that when a specific switch located in the vehicle compartment is operated, the detailed warning lamp information is displayed. (Such switches include a steering switch located on the steering wheel and a panel switch located on the meter panel.) The above embodiment is so constructed that when the help icon displayed on the display device is operated, help can be obtained from the operator or the dealer's personnel. Instead, the invention may be so constructed that when the specific switch located in the vehicle compartment is operated, help can be obtained form the operator or the dealer's personnel.

In the above-mentioned embodiments, the warning icons and the help icons are displayed on the display device. Instead, the invention may be so constructed that the warning icons and the help icons are displayed on a windshield display (head-up display) or a display device incorporated in the meter panel.

The detailed warning lamp information is not limited to the description of the content of warning or coping strategies. It may include, for example, information on contacts, such as garages, and information on the inventory of replacement parts.

The above-mentioned embodiments are so constructed that the warning lamps on the meter panel light up. Instead, the invention may be so constructed that the warning lamps on the meter panel flash.

The server system, operator system, and dealer system may belong to one and the same organization or may belong to different organizations.

The second embodiment is so constructed that to prompt the user to perform an operation for making an emergency stop, vibration is forcibly applied to the steering wheel. Instead, the invention may be so constructed that vibration is forcibly applied to tires to the extent that driving is not disturbed or the user is prompted to perform an operation for making the emergency stop through any other component.

The invention claimed is:

1. An in-vehicle system that is mounted in a vehicle and is so constructed that one warning lamp from a plurality of warning lamps on a meter panel lights up or flashes in correspondence with an occurrence of an anomaly in the vehicle, comprising:

means for displaying information;

means for notifying the occurrence of the anomaly, the notifying means including the displaying means;

means for controlling the notifying means to provide detailed warning lamp information about the one warning lamp when the one warning lamp on the meter panel lights up or flashes; and first means for communicating with an operator system or a dealer system through a network; wherein the displaying means displays a warning icon and a help icon that identify a cause of the anomaly or a device associated with the anomaly;

the controlling means causes the displaying means to display the detailed warning lamp information about the one warning lamp when the warning icon displayed on the displaying means is operated by a user as a first predetermined operation; and the controlling means causes the first communicating means to establish a communication line between the first communicating means and the operator system or the dealer system when the help icon displayed on the displaying means is operated by the user as a second predetermined operation.

2. The in-vehicle system according to claim 1, further comprising:

means for storing detailed warning lamp information about the warning lamps on the meter panel, wherein when the one warning lamp on the meter panel lights up or flashes, the controlling means reads detailed warning lamp information stored in the storing means, and thereby causes the notifying means to provide detailed warning lamp information about the one warning lamp.

3. The in-vehicle system according to claim 1, comprising:

second means for communicating with a server system in possession of detailed warning lamp information about the warning lamps on the meter panel through a network, wherein when the one warning lamp on the meter panel lights up or flashes, the controlling means causes the second communicating means to establish a communication line between the second communicating means and the server system, causes the second communicating means to receive detailed warning lamp information from the server system, and thereby causes the notifying means to provide the detailed warning lamp information about the one warning lamp.

4. The in-vehicle system according to claim 1, wherein the controlling means causes the displaying means to display the detailed warning lamp information through the use of a hyperlink function.

5. The in-vehicle system according to claim 1, wherein the controlling means causes the displaying means to display the detailed warning lamp information through the use of an interaction function.

6. The in-vehicle system according to claim 1, wherein when the one warning lamp on the meter panel lights up or flashes, the controlling means causes the notifying means to provide the detailed warning lamp information about the lighted or flashing warning lamp and further determines whether or not an emergency stop is required, and, when the controlling means detects that the emergency stop is required, causes the notifying means to notify of the necessity for making the emergency stop.

7. The in-vehicle system according to claim 6, wherein:

when the controlling means detects that the emergency stop is required, the controlling means causes an automobile navigation system to carry out route search with a safe place where the emergency stop can be made as the destination and to provide route guidance to the safe place.

8. The in-vehicle system according to claim 6, wherein when the controlling means detects that an operation for making the emergency stop has not been performed by the user, the controlling means carries out processing to prompt the user to perform an operation for making the emergency stop.

9. The in-vehicle system according to claim 1, wherein the controlling means possesses history information on a state of the vehicle, and, when the one warning lamp on the meter panel lights up or flashes, causes the notifying means to also provide detailed warning lamp information about the lighted or flashing warning lamp, and further causes the notifying means to provide the history information on the state of the vehicle.

* * * * *